United States Patent
Park (10) Patent No.: US 6,327,907 B1
(45) Date of Patent: Dec. 11, 2001

(54) MICROGYROSCOPE HAVING ASYMMETRIC COMB SENSORS

(75) Inventor: Kyu-Yeon Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/475,168

(22) Filed: Dec. 30, 1999

(30) Foreign Application Priority Data

Jun. 4, 1999 (KR) .................................................. 99/20651
Oct. 29, 1999 (KR) .................................................. 99/47401

(51) Int. Cl.[7] .................................................. G01P 9/04
(52) U.S. Cl. .................................... 73/504.12; 73/504.14
(58) Field of Search ........................... 73/504.04, 504.12, 73/504.13, 504.14, 504.15, 504.16, 504.02

(56) References Cited

U.S. PATENT DOCUMENTS

| | | | |
|---|---|---|---|
| 5,728,936 | * 3/1998 | Lutz | 73/504.14 |
| 5,747,690 | 5/1998 | Park et al. | 73/504.12 |
| 6,067,858 | * 5/2000 | Clark et al. | 73/504.16 |
| 6,089,088 | * 7/2000 | Charvet | 73/504.12 |
| 6,089,089 | * 7/2000 | Hsu | 73/504.12 |
| 6,122,961 | * 9/2000 | Green et al. | 73/504.12 |
| 6,134,961 | * 10/2000 | Touge et al. | 73/504.12 |

* cited by examiner

Primary Examiner—Helen Kwok
(74) Attorney, Agent, or Firm—Lowe Hauptman Gilman & Berner, LLP (57) ABSTRACT

A microgyroscope of a microstructure is disclosed, in which a voltage supplied to the exciting comb drivers of an outer frame is easily offset, and the exciting comb drivers are stably resonated without being influenced by an exciting voltage. The microgyroscope includes an inner frame 110 installed within an outer frame 120 across beam elastic bodies 130. Elastic exciting bodies 230 are installed at four corners of the outer frame 120 excitingly in an exciting direction (x axis). Exciting comb drivers 250 and 250' are installed to dispose a plurality of combs between a plurality of frame part exciting combs 220. At both sides of the outer frame 120, a plurality of combs 280 of comb sensors 270 and 270' are installed horizontally asymmetrically, so that the interfering signals transmitted to the comb sensors can be offset.

10 Claims, 7 Drawing Sheets

PRIOR ART

FIG. 1

PRIOR ART

FIG. 2a

PRIOR ART

MICROGYROSCOPE HAVING ASYMMETRIC COMB SENSORS

FIELD OF THE INVENTION

The present invention relates to a microgyroscope of a microstructure, in which a voltage supplied to the exciting comb drivers of an outer frame is easily offset, and the exciting comb drivers are stably resonated without being influenced by an exciting voltage. Particularly, the present invention relates to a microgyroscope of a microstructure, in which sensing direction beam elastic bodies are provided within the outer frame to install an inner frame, further comb sensors with combs arranged horizontally are asymmetrically installed at both sides of the outer frame, and exciting direction elastic bodies are installed at four corners of the outer frame so as to separate the oscillations under the exciting and sensing modes, so that the voltage supplied to the exciting comb drivers of the outer frame can be easily damped through comb sensing parts of the both sides, thereby ensuring stable resonances of the microgyroscope without being influenced by the exciting voltage.

BACKGROUND OF THE INVENTION

Generally, the angular velocity sensing devices for detecting the angular velocities of inertial bodies have been widely employed as a component of navigation apparatus in the ocean vessels, air planes and the like. At the present, this device has been extended to the navigation apparatus of automobiles, and to the high performance video cameras as a hand-oscillation compensating device.

The conventional gyroscope which has been used for military purposes and for air planes is manufactured by using a plurality of high precision components and through a complicated assembling process, and therefore, a precise performance is possible. However, its manufacturing cost is high, and its bulk is very large, with the result that it cannot be used for the general industries, and for the home power appliances.

Recently, a small gyroscope has been developed by attaching a piezoelectric device to a triangular prism beam, and this is used as a hand-oscillation sensor for a small video camera. Further, in order to overcome the difficulties of the gyroscope having the piezoelectric device, a small gyroscope with an improved cylindrical beam structure has been developed.

However, these two kinds of the small gyroscopes require precisely machined components, and therefore, the manufacture becomes difficult, while the manufacturing cost becomes high. Further, the mentioned two kinds of gyroscope includes a plurality of mechanical components, and therefore, it is difficult to form a circuit integration.

The principle of the gyroscope is as follows. That is, when a rotating inertial body which rotates or oscillates in a first axis direction receives an input of an angular velocity in a second axis direction (which is perpendicular to the first axis direction), the gyroscope detects a Coriolis force which acts in a third axis direction (which is rectangular to the first and second axes direction).

Under this condition, if the forces acting on the inertial body are made to be balanced, then the detection of the angular velocity has to be more precise. Particularly, if the linearity and the band width are to be expanded, a force balancing structure is required.

Figure 1:
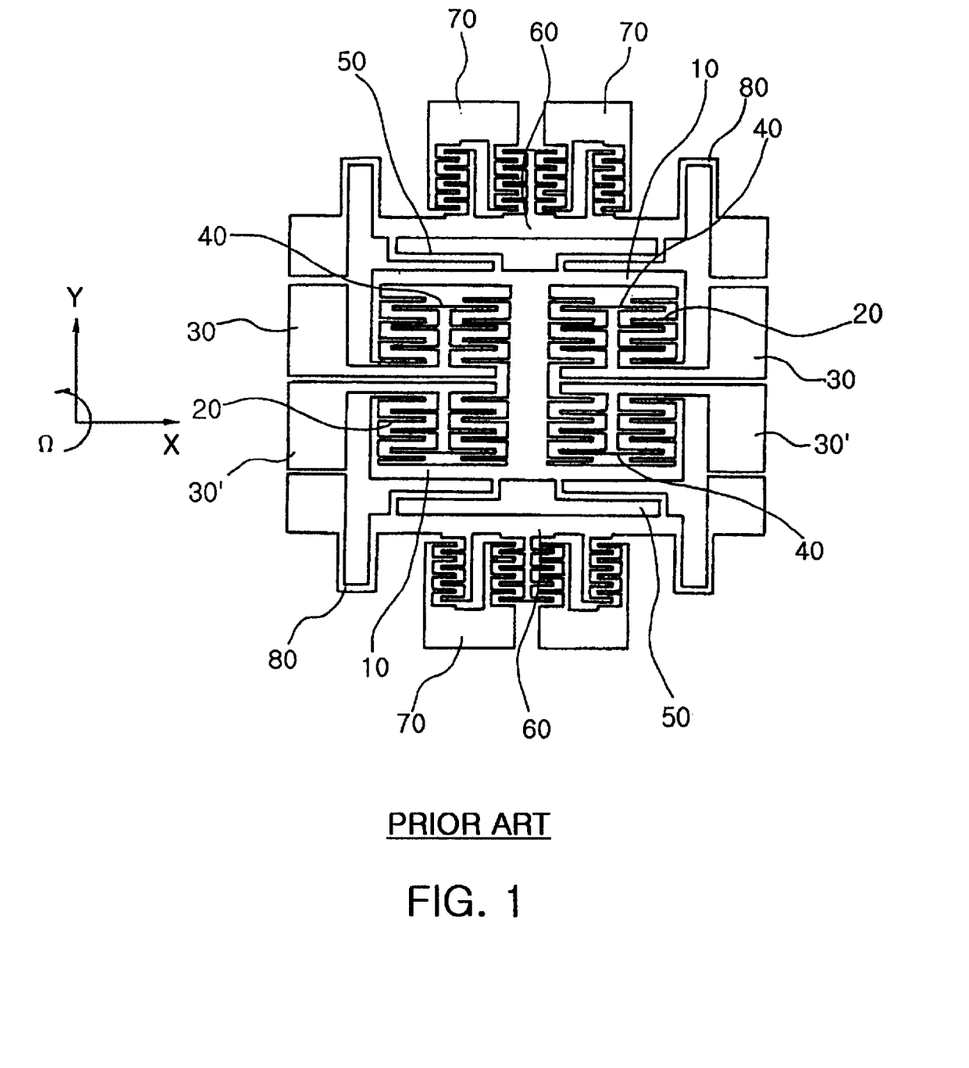
FIG. 1 is a plan view of a conventional microgyroscope.

A conventional microgyroscope related to this technique is illustrated in FIG. 1.

As shown in FIG. 1, the microgyroscope includes: a plurality of combs 20 installed within a frame 10 in the lateral direction and in the sensing direction (y axis direction); a plurality of sensing direction (y axis direction) sensing electrodes 40 interposed between the combs 20, the electrodes 40 being supported by positive and negative electrode supporting parts 30 and 30'; sensing direction elastic bodies 50 installed at four places (the top and bottom and left and right) of the frame 10; oscillation structures 60 installed on the sensing direction elastic bodies 50 in the exciting direction (x axis); comb drivers 70 for causing oscillations on the oscillation structures 60 by supplying voltages; and exciting direction elastic bodies 80 disposed at the four corners of the oscillations structure.

In the conventional microgyroscope constituted as described above, the oscillation structures 60 are oscillated in the exciting direction (x axis) by receiving an ac voltage from the exciting drivers 70. When the oscillation structures 60 are oscillated, if an angular velocity input is received in a direction (y axis) perpendicular to the plane of the gyroscope, then a Coriolis force is generated in the sensing direction, with the result that the internal structures of the frame 10 are moved in the sensing direction. This movement causes a variation of the capacitance between the sensing electrodes 40 and the combs 20. Thus the amount of the angular velocity can be calculated by measuring the varied capacitance.

In the above described case, the oscillations caused by the influence of the oscillation structures 60 and the internal structures of the frame 10 can be reduced by separating the elastic exciting bodies 80 and the sensing direction elastic bodies 50 of the frame 10 of the gyroscope from each other by making them symmetric. However, there is a problem as described below. That is, the upper and lower portions of the oscillation structures 60 are installed on the sensing direction elastic bodies 50, and therefore, the upper portion and the lower portion of the oscillation structures make unstable movements up and down respectively.

Particularly, if the oscillation structures 60 and the frame 10 are to make stable oscillations in the exciting direction (x axis), there is required an element for sensing the oscillations of the oscillation structures. The oscillation signals which are detected by the oscillation sensing element supply certain exciting signals through a control circuit (which includes an external sensing circuit and an amplifying circuit) to the comb drivers 70. The oscillation structures 60 and the frame 10 perform stable oscillations at a resonance frequency which is decided by the mass of the oscillation structures 60, and the mass of the frame 10, and by the value of the exciting direction elastic bodies.

Figure 2A:
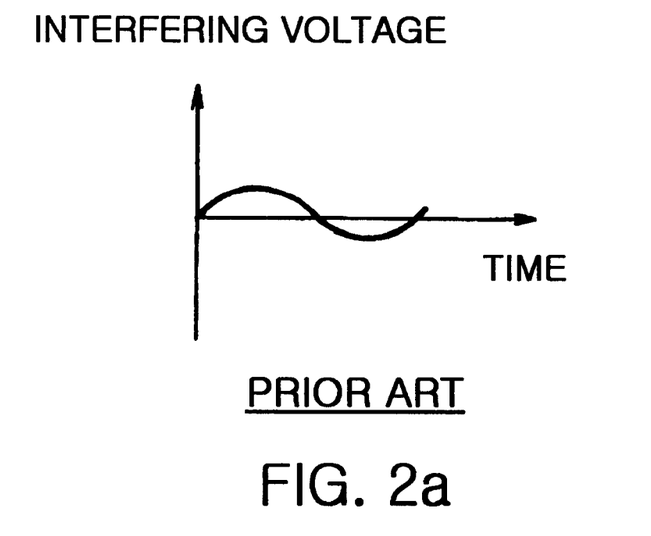
FIGS. 2A and 2B are graphical illustrations showing the signal interference by the exciting voltages transmitted to both sides of the frame of the gyroscope when the oscillation structures (comb drivers) supply the exciting voltages.
Figure 2B:
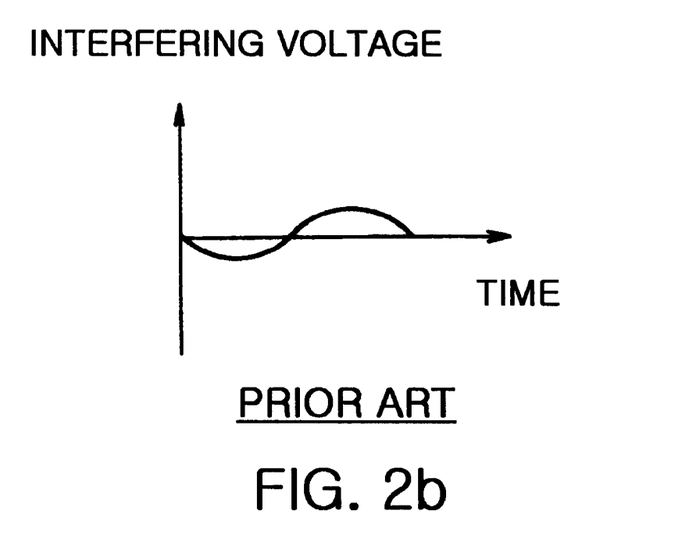

FIGS. 2A and 2B are graphical illustrations showing the ac signal interference by the exciting voltage supplied to both sides of the exciting comb drivers 70. As shown in these drawings, a negative interference effect is invited to the oscillation signals of the oscillation detecting element. Accordingly, stable oscillations become impossible.

SUMMARY OF THE INVENTION

The present invention is intended to overcome the above described disadvantages of the conventional techniques.

Therefore it is an object of the present invention to provide a microgyroscope in which an interference effect by a voltage supplied to the exciting comb drivers of an outer frame are easily damped by asymmetric comb sensors, thus the microgyroscope is stably resonated without being influenced by the magnitude of the exciting voltage, thus the microgyroscope can be magnetically oscillated even under a vacuum with a large air resistance, thus the resolving power and the sensitivity of the gyroscope are maximized, and thus the life expectancy of the gyroscope can be extended.

In achieving the above object, the microgyroscope according to the present invention includes: an inner frame excitingly installed within an outer frame; a plurality of combs installed laterally and in a sensing direction (y axis) at both sides of the inner frame; sensing direction sensing electrodes disposed between the plurality of the combs at certain intervals, and supported by upper and lower electrode supporting parts; elastic beam bodies installed between the inner and outer frames excitingly in the sensing direction; comb sensors installed asymmetrically at both sides of the outer frame in a horizontal direction; elastic bodies installed at four corners of the outer frame excitingly in an exciting direction (x axis); and exciting drivers installed above and below of the outer frame, for causing oscillations of the combs by supplying voltages.

BRIEF DESCRIPTION OF THE DRAWINGS

The above object and other advantages of the present invention will become more apparent by describing in detail the preferred embodiment of the present invention with reference to the attached drawings in which:

FIG. 6 is a graphical illustration showing the interference of the signals supplied to the both sides of the comb sensors from the exciting comb drivers, in which

DETAILED DESCRIPTION OF THE PREFERRED EMBODIMENTS

Figure 3:
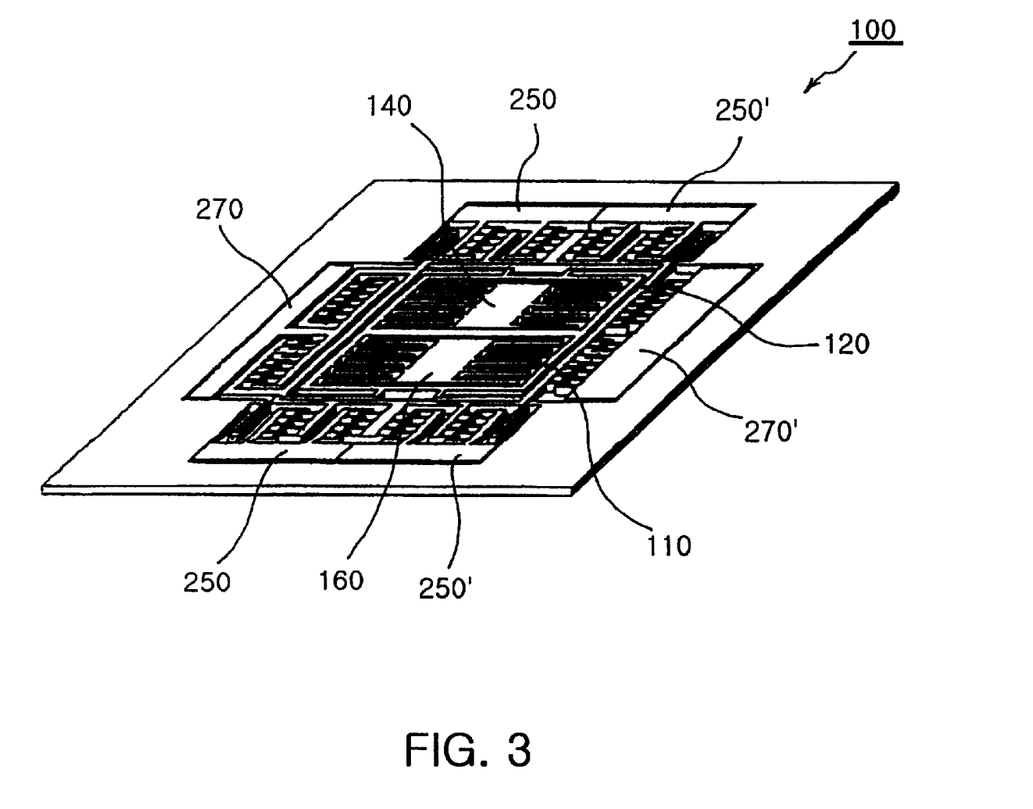
FIG. 3 is a schematic perspective view showing the constitution of the microgyroscope according to the present invention.
Figure 4:
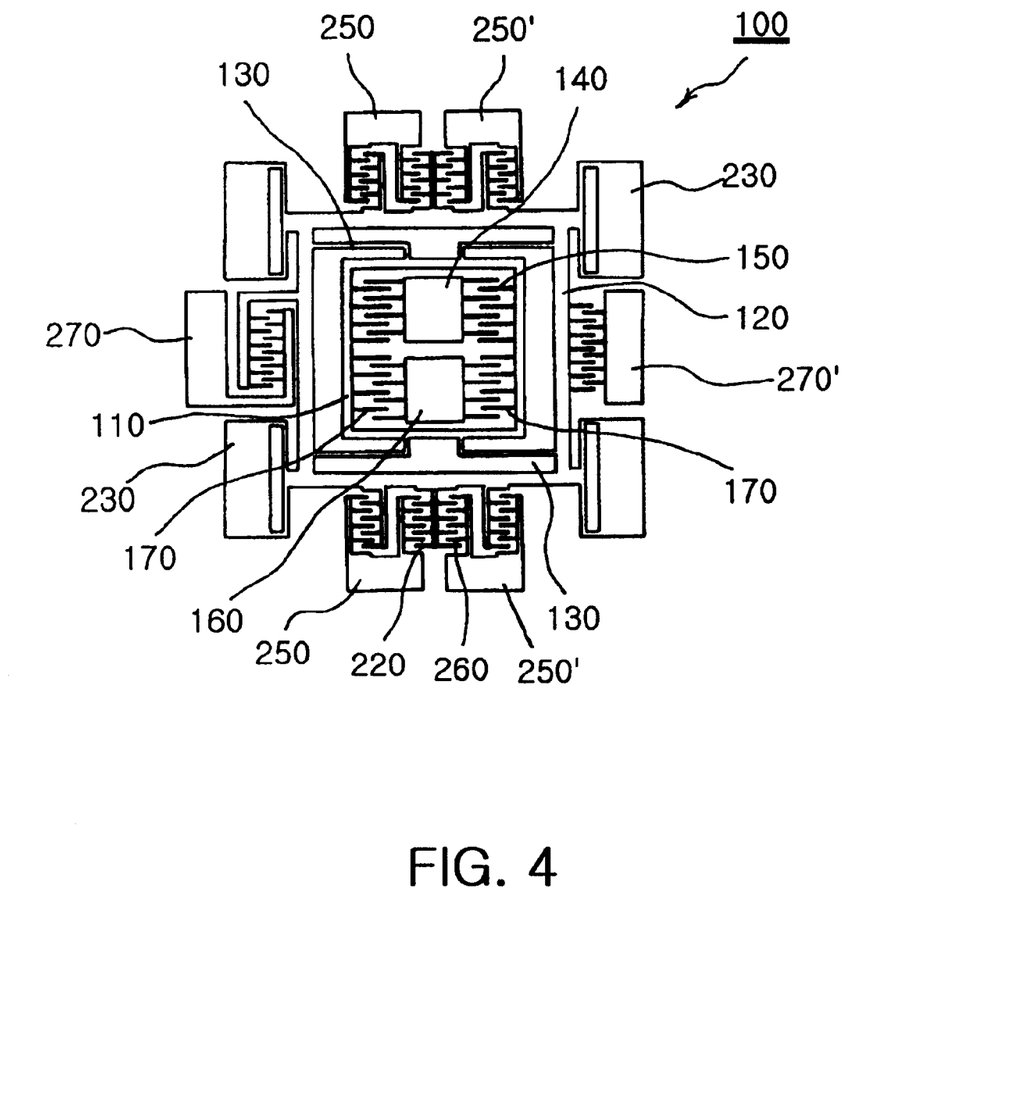
FIG. 4 is a plan view of the microgyroscope according to the present invention.
Figure 5:
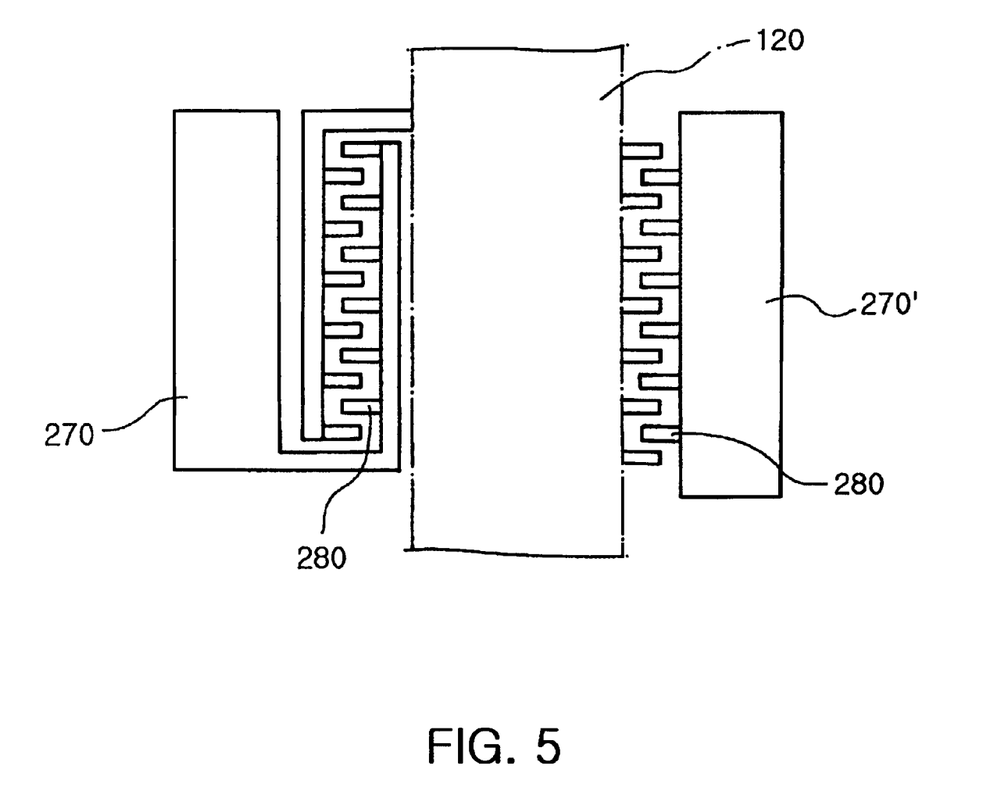
FIG. 5 illustrates the critical portion of the asymmetric comb sensors installed at both sides of the outer frame, for offsetting the signal-interfered exciting voltages.

FIG. 3 is a schematic perspective view showing the constitution of the microgyroscope according to the present invention. FIG. 4 is a plan view of the microgyroscope according to the present invention. FIG. 5 illustrates the critical portion of the asymmetric comb sensors installed at both sides of the outer frame, for offsetting the signal-interfered exciting voltages.

The exciting structure of the gyroscope device 100 according to the present invention includes: an inner frame 110 having a Coriolis sensing part; an outer frame 120; comb sensors 270 and 270' installed at both sides of the outer frame 120; and exciting comb drivers 250 and 250' installed at front and rear of the outer frame 120.

The inner frame 110 which is the mass portion of the gyroscope device 100 is provided with elastic beam bodies 130 which are installed at upper and bottom and right and left sides of the inner frame 110 within the outer frame 120 so as to be oscillated in the sensing direction (y axis). Within the inner frame 110, there are installed a plurality of combs 150 in the y axis direction. Between the respective combs 150, there are disposed sensing electrodes 170 in the sensing direction (y axis) by being integrally supported by upper and lower electrode supporting parts 140 and 160.

The elastic beam bodies 130 which are installed at four places between the outer and inner bodies 120 and 110 are installed in such a manner that when the oscillations in the sensing direction (y axis) by the Coriolis force are sensed based on the difference of the capacitances between the sensing electrodes 170 and the combs 150, the inner frame 110 should be oscillated in the sensing direction.

Further, the outer frame 120 is installed at the outside of the inner frame 110, with the sensing direction elastic beam bodies 130 involved therebetween. At both sides of the outer frame 120, there are installed a plurality of combs 220, in such a manner that the combs 220 can be excited in the exciting direction (x axis) through elastic exciting bodies 230 which are installed at the four corners of the outer frame 120.

The exciting combs 220 which are installed at the outside of the outer frame 120 are disposed with gaps between combs 260 which are integrally formed with exciting comb drivers 250 and 250', and which are driven by supplying a voltage. The outer frame 120 is excited by the electrostatic forces generated between the combs 220 of the outer frame 120 and the combs 260 of the exciting comb drivers 250 and 250'.

Under this condition, the exciting comb drivers 250 and 250' which excite the outer frame 120 in the left and right horizontal direction (x axis) are disposed parallelly to the lateral direction of the outer frame 120. The plurality of the combs 260 which are integrally formed with the exciting drivers 250 and 250' are disposed between the combs 220 of the outer frame 120.

FIG. 5 illustrates the critical portion of the asymmetric comb sensors installed at both sides of the outer frame, for offsetting the signal-interfered exciting voltages. The comb sensors 270 and 270' are sensing the exciting direction oscillations of the outer and inner frames 120 and 110, and are integrally connected to combs 280 which are horizontally asymmetrically installed.

The comb sensors 270 and 270' are integrally connected to the horizontally extending combs 280 at both sides of the outer frame 120 as described above. When the exciting combs 220 are excited through the exciting comb drivers 250 and 250', the exciting voltages are transmitted through the outer frame 120 (or its bottom face), so that the comb sensor 270 can be prevented from being influenced by an interference.

Figure 6A:
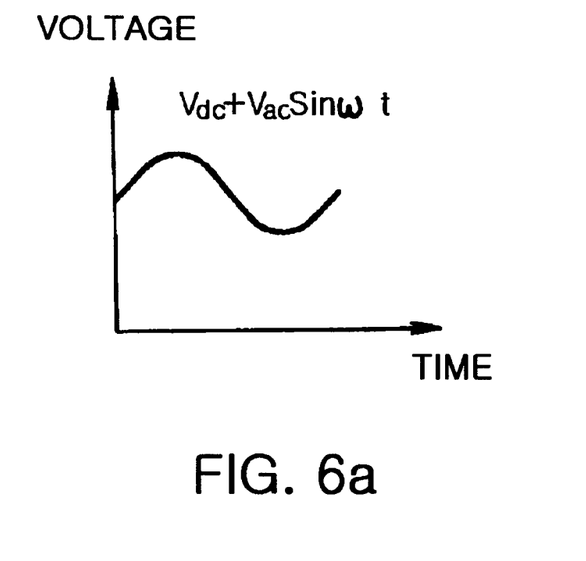
FIGS. 6A and 6B are graphical illustrations showing the signal interference by the exciting voltages supplied to the both sides of the comb sensors.
Figure 6B:
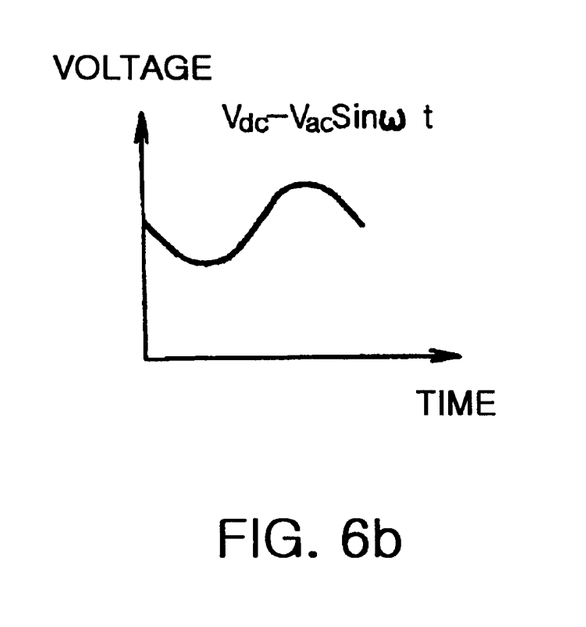
Figure 6C:
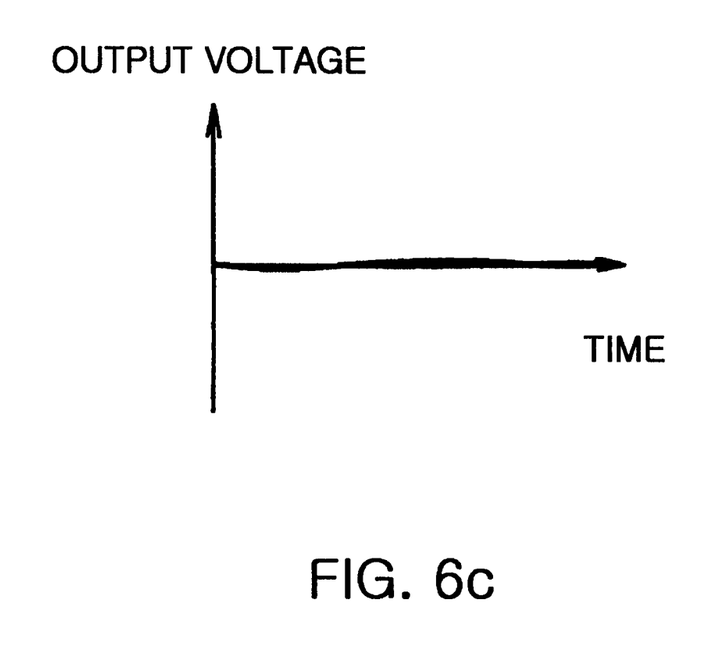
FIG. 6C is a graphical illustration showing the offsetting of the interfered signals through the exciting comb drivers.

Particularly, the exciting comb drivers 250 and 250' to which the positive and negative voltages are supplied are installed symmetrically. As graphically illustrated in FIG. 6, The ac interfering voltages based on the exciting voltages $V_{dc}+V_{ac}\sin\omega t$ (FIG. 6A) and $V_{dc}-V_{ac}\sin\omega t$ (FIG. 6B) are mutually offset if the sensing signals of the comb sensors 270 and 270' are circuitally added together. (refer to FIG. 6C)

Accordingly, the microgyroscope is stably resonated without being influenced by the exciting voltages.

Meanwhile, the exciting elastic bodies 230 which are installed at the four corners of the outer frame 120 are U-shaped. When the exciting elastic bodies 230 are excited under the exciting mode by receiving the positive and negative voltages, the coupling is absorbed by the exciting elastic bodies 230, thereby almost eliminating the dislocation in the sensing direction.

Now the present invention will be described as to its operation.

As shown in FIG. 5, the inner frame 110 as an oscillation structure having a mass M, and the outer frame 120 having a mass of Mo as an oscillation structure, have separate elastic exciting bodies 230 in the exciting direction (x axis) and beam elastic bodies 130 in the sensing direction (y axis) respectively. In the above described oscillation system, an external force f which excites the oscillation structures in the direction of the x axis can be expressed by the following formula:

$$f = F \sin(\omega t)$$

Meanwhile, the dislocation x and the velocity V in the direction of the x axis can be expressed by the following formulas:

$$x = \frac{FQx}{kx}\cos(\bar{\omega}t)$$

$$Vx = \frac{FQx\omega}{kx}\sin(\bar{\omega}t)$$

where x is the dislocation in the direction of the x axis, and Vx is the velocity of the oscillation structure in the direction of the x axis.

The dislocation in the direction of the y axis owing to the Coriolis force which is proportional to the inputted angular velocity is calculated based on the following formula:

$$y = \frac{2fQxQy}{\omega k}\Omega\sin(\bar{\omega}t)$$

where Qx and Qy are constants applicable to the directions of the x axis and the y axis, and Ω is the inputted angular velocity.

Therefore, if the y dislocation is detected, then the angular velocity of the inertial body can be measured.

In the gyroscope device 100 of the present invention, the mass M corresponds to the mass M and Mo of the oscillation structures. Thus if an ac voltage which corresponds to the natural oscillation frequency of the exciting comb drivers 250 and 250' is supplied, then oscillations occur in the direction of the x axis owing to the electrostatic forces between the combs 220 and 260.

Such forces of the exciting comb drivers 250 and 250' can be expressed by the following formula:

$$f_x = \frac{\epsilon t n_x V^2}{h}$$

where f is the driving force, ∈ is the dielectric constant of air, t is the thickness of the comb, $n_x$ is the number of the pairs of the combs, V is the driving voltage, and h is the distance between the combs.

The oscillation structure which receives the defined driving force oscillates in accordance with the natural oscillation frequency. In order to maintain this natural oscillation frequency, a voltage which satisfies the unstable oscillation control conditions is generated based on the detected movements, thereby activating the exciting comb drivers 250 and 250'.

If an angular velocity is inputted to the oscillating structure, the oscillation structure makes oscillating movements in the direction of the x axis, and at the same time, makes a dislocation in the direction of the y axis. This dislocation causes a variation in the capacitance formed between the sensing electrodes 170 of the positive and negative electrode supporting parts 140 and 160 and the combs 150 of the inner frame 110 which is the oscillation structure.

As shown in FIG. 3, the sensing electrodes 170 consist of anodes and cathodes which are formed integrally with the electrode supporting parts 140 and 160. The variations of the capacitances of the anodes are opposite to the variations of the capacitances of the cathodes, and therefore, if the differences between the capacitances of the anodes and the cathodes are calculated, then the dislocation of the oscillation structure in the direction of the y axis can be measured.

The difference ΔC of the capacitances between the anodes and the cathodes is calculated based on the following formula:

$$\Delta C = \frac{2\epsilon l_s t n_s}{h_s^2} y$$

where $n_s$ is the number of the pairs of the sensing electrodes 170, ∈ is the dielectric constant of air, ls is the length of the sensing electrode, t is the thickness between the combs 150 of the inner frame 110 (as the oscillation structure) and the sensing electrodes 170 of the electrode supporting parts 140 and 160, and $h_s$ is the gap between the sensing electrode and the oscillation structure.

If there is used the general circuit for detecting the variations of the capacitances, then the voltage signals which are proportional to the variations of the capacitances can be detected, and consequently, the signals of the angular velocity can be detected.

Meanwhile, as a common factor which decides the performance of the gyroscope, the dislocation in the direction of the y axis by the Coriolis force has to be maximized, and for this purpose, the natural oscillation frequencies of the x axis and the y axis need to be made to correspond to each other.

In the present invention, the stiffness is influenced in the direction of the y axis by the electrostatic forces of the sensing electrodes 170, and therefore, by utilizing these electrostatic forces, the natural oscillation frequency can be adjusted. The natural oscillation frequency in the direction of the y axis can be expressed by the following formula:

$$fn = \frac{1}{2\pi}\sqrt{\frac{k_b - k_n}{m}}$$

where $k_b$ is the constant of the elastic body, and $k_n$ is the constant of the elastic body, which is generated by the electrostatic forces between the sensing electrodes and the combs as the oscillation structure.

The constant $k_n$ can be expressed by the following formula:

$$k_n = \frac{2\epsilon l_s t n_s}{h_s^3} V_b^2$$

where $V_b$ is the bias voltage supplied to the sensing electrodes.

By adjusting the bias voltage, the natural oscillation frequency of the y axis can be made to correspond to the natural oscillation frequency of the x axis.

Further, the exciting comb drivers 250 and 250' which receive the positive and negative voltages are installed in a symmetric form, while the comb sensors 270 and 270' are installed in an asymmetric form. Thus as graphically illustrated in FIG. 6, the ac interfering voltages based on the exciting voltages $V_{dc}+V_{ac}\sin\omega t$ (FIG. 6A) and $V_{dc}-V_{ac}\sin\omega t$ (FIG. 6B) are mutually offset if the sensing signals of the comb sensors 270 and 270' are circuitally added together. Accordingly, the microgyroscope is stably resonated without being influenced by the exciting voltages.

According to the present invention as described above, an interference effect by a voltage supplied to the exciting comb drivers of an outer frame are easily damped by asymmetric comb sensors, thus the microgyroscope is stably resonated without being influenced by the magnitude of the exciting voltage, thus the microgyroscope can be magnetically oscillated even under a vacuum with a large air resistance, thus the resolving power and the sensitivity of the gyroscope are maximized, and thus the life expectancy of the gyroscope can be extended.

In the above, the present invention was described based on the specific preferred embodiments and the attached drawings, but it should be apparent to those ordinarily skilled in the art that various changes and modifications can be added without departing from the spirit and scope of the present invention, which are defined in the appended claims.

What is claimed is:

1. A microgyroscope, comprising:
   an outer frame;
   an inner frame installed within said outer frame;
   a plurality of combs installed laterally and in a sensing direction (y axis) at both sides of said inner frame;
   sensing direction sensing electrodes disposed between the plurality of said combs at certain intervals, and supported by upper and lower electrode supporting parts;
   elastic beam bodies installed between said inner and outer frames in the sensing direction;
   comb sensors installed asymmetrically at both sides of said outer frame in a horizontal direction;
   elastic bodies installed at four corners of said outer frame in an exciting direction (x axis); and
   exciting comb drivers installed symmetrically above and below said outer frame, for causing oscillations of the plurality of said combs by exciting voltages applied thereto.

2. The microgyroscope as claimed in claim 1, wherein, on said inner frame, said beam elastic bodies are installed at four places (at front and rear, and at left and right) so as to be excited together with said outer frame.

3. The microgyroscope as claimed in claim 1, further comprising exciting combs on said outer frame interdigitated with said exciting comb drivers, said exciting comb drivers being excited by exciting voltages applied thereto.

4. The microgyroscope as claimed in claim 1, wherein interfering voltages caused by the exciting voltages ($V_{dc}+V_{ac}\sin\omega t$ and $V_{dc}-V_{ac}\sin\omega t$) are mutually offset if sensing signals of the comb sensors are added together.

5. A microgyroscope, comprising:
   an outer frame
   an inner frame installed within the outer frame;
   Coriolis sensing parts installed inside the inner frame for detecting deflections of the inner and outer frames along a sensing (Y) axis;
   elastic beam bodies installed between the inner and outer frames for dumping oscillations along the sensing axis;
   comb sensors installed asymmetrically outside the outer frame at two lateral sides thereof;
   exciting comb drivers installed symmetrically at upper and lower sides of the outer frame for oscillating the Coriolis sensing parts along an exciting (X) axis by exciting voltages applied thereto.

6. The microgyroscope as claimed in claim 5, wherein the comb sensors comprise a plurality of first comb fingers interdigitated with a plurality of second comb fingers, said first comb fingers projecting from the outer frame in substantially the same direction.

7. The microgyroscope as claimed in claim 6, wherein said second comb fingers extend in a direction opposite to the direction of said first comb fingers along the exciting axis.

8. The microgyroscope as claimed in claim 5, wherein the Coriolis sensing parts comprise a plurality of third comb fingers projecting inwardly from two lateral sides of the inner frame, and a plurality of sensing direction sensing electrodes interdigitated with said third comb fingers and supported by at least one electrode supporting part located within the inner frame.

9. The microgyroscope as claimed in claim 5, further comprising elastic bodies installed at four corners of the outer frame for dumping oscillations along the exciting axis.

10. The microgyroscope as claimed in claim 5, wherein the exciting drivers comprise two identical exciting comb drivers installed at upper and lower sides of the outer frame, respectively, each of said exciting comb drivers including a plurality of fourth comb fingers connected to receive said exciting voltages, and a plurality of fifth comb fingers extending from the outer frame along the exciting axis and interdigitated with said fourth comb fingers.

* * * * *